June 24, 1924.
G. BERNERT
PNEUMATIC PRESSURE CURRENT CONVEYER
Filed Aug. 19, 1920
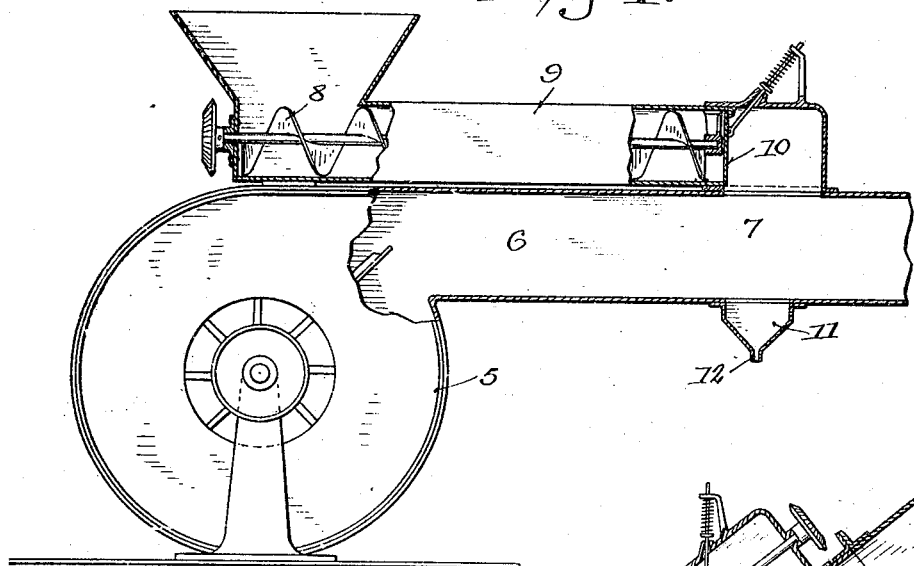
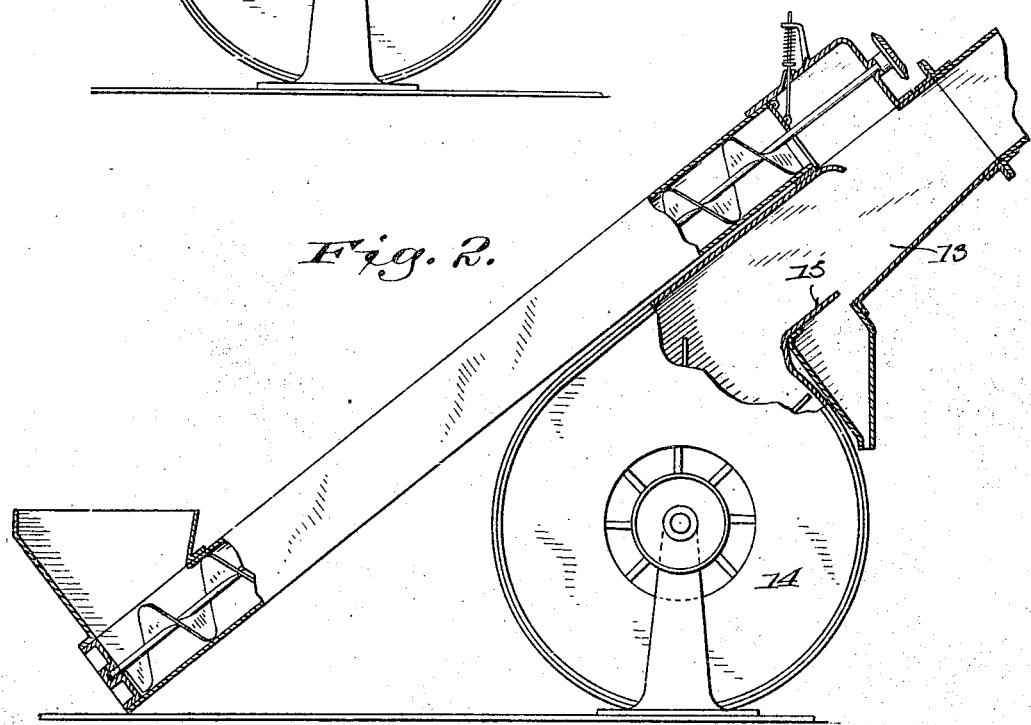
INVENTOR.
George Bernert
BY
Frank S. Ratcliffe ATTORNEY.

Patented June 24, 1924.

1,498,776

UNITED STATES PATENT OFFICE.

GEORGE BERNERT, OF MILWAUKEE, WISCONSIN.

PNEUMATIC-PRESSURE-CURRENT CONVEYER.

Application filed August 19, 1920. Serial No. 404,589.

*To all whom it may concern:*

Be it known that I, GEORGE BERNERT, a citizen of the United States, and resident of Milwaukee, in the county of Milwaukee and State of Wisconsin, have invented certain new and useful Improvements in Pneumatic - Pressure - Current Conveyers; and I do hereby declare that the following is a full, clear, and exact description thereof.

My invention relates to new and useful improvements in conveying apparatus for bulk materials, of that type shown in my Reissue Patent No. 14,841, issued April 20, 1920, wherein there is provided a blower fan having an air duct extending therefrom and apertured in its top portion for the reception of material to be conveyed, said duct being also provided with a pocket adapted to catch material tending to drop back into the fan when adverse conveying conditions prevail which prevent the proper movement of the material by the air current.

It is the object of my present invention to provide an improved means for removing from the duct grain or other material which is not properly taken up by the conveying action of the air. In the present instance I have shown the conveying duct extended horizontally from the fan casing, in which instance the grain would not tend to drop back into the fan casing, but would build up an accumulation in the duct, shutting off the effective cross-sectional conveying area thereof, and it is more particularly my object in this connection to provide an arrangement for removing surplus material to be conveyed from the air duct under adverse conditions of operation so as to facilitate prompt resumption of proper operative conditions for conveying.

It is further an important object of my invention to simplify the structure of the surplus grain-removing means, particularly by utilizing the conveying pressure of the air for the discharge of surplus material without the necessity of conveying said material through the entire conveying system.

With the above and other objects and advantages in view, my invention resides more particularly in the novel combination, formation and arrangement of parts hereinafter described and pointed out in the appended claims.

In the accompanying drawings

Figure 1 is a side elevational view of a pneumatic grain conveyer embodying my present invention, with parts broken away and in section to more clearly show the structure thereof;

Figure 2 is a similar view illustrating the application of my invention to an inclined duct.

Referring now more particularly to the accompanying drawings, 5 designates the usual blower fan casing from which in Figure 1 extends a horizontal air duct 6 provided in its top with an aperture 7 for the reception of grain fed by the action of a screw-conveyer 8 through a casing 9 disposed on top of the duct 6, the usual valve 10 being hinged in the discharge end portion of the casing 9 for controlling back pressure flow of air.

When adverse conveying conditions occur in the present structure, either by a lessening of the air currents, or by excessive weight or volume of the material conveyed in proportion to the given air current pressure and velocity, the grain falls entirely across the duct to the bottom thereof and then tends to roll on the bottom of the duct in the direction of the air current and to build up an obstructing pile of grain, which further reduces the conveying capacity by restricting the cross-sectional area, thus producing a progressively more unfavorable condition which must be eliminated by entirely cutting off the supply of grain and then waiting for the air current passing through said area to gradually increase the area, picking up the accumulated grain and carrying the same through the system so as to procure the normal cross-sectional area of the system for a resumption of the conveying operation. If the duct 9 were inclined, the grain would naturally tend to roll down the same toward the fan casing and be trapped in the pocket shown in my said patent adjacent the discharge mouth of the fan casing.

To prevent the accumulation of grain in a horizontal casing in the adverse manner described, I provide a pocket 11 in the bottom of the casing at the point of impact of grain which would entirely traverse the casing under adverse conveying operations, and inasmuch as the surplus grain in adverse conveying conditions would fall almost vertically across the casing, the pocket is substantially directly under the discharge point of the valve 10, or spaced a slight distance therefrom in the direction of the conveying air current. This pocket is substantially hopper shaped in cross-section and at the bottom of the pocket a slit 12 is provided opening into the atmosphere. The area of this slit is such that in normal operation of the apparatus the amount of back pressure air constantly escaping therethrough does not materially affect the general conveying pressure. However, should adverse conditions occur under which grain would find its way into the pocket, the air escaping through the slit would carry the grain therewith and clear the pocket of accumulations of surplus grain, thus performing substantially the same function effected by the screw conveyer and valve mechanism of the grain trapping pocket shown in my said patent. I thus, in the present arrangement, utilize an immaterial quantity of the pressure current of air to clear the pocket of surplus grain and thus effect a decided simplicity of structure and the amount of power wasted through loss of air through the pocket slit corresponds in my previous patent to the amount of power necessary to drive the mechanical clearing means for the pocket. By reason of the restricted nature of the outlet slit, I am also enabled to avoid the necessity of providing a valve for the grain-clearing pocket, and a valve would not be expedient or effective unless the pocket were of such length as to constitute a boot to permit the accumulation of a substantial column of material therein, since the pressure of air escaping through the slit would maintain a valve constantly open if the valve had sufficient sensitiveness to yield for the discharge of grain.

As shown in Figure 2 the pocket 11 and its slit bottom may be as well associated with the type of conveyer wherein the conveying duct 13 extends obliquely upward from the fan casing 14 as shown in my said previous patent, and in Figure 2 the pocket is of considerable size and vertical extent and the inclined conveying duct is enlarged adjacent its feed opening and a wall 15 extends over the pocket from its side adjacent the blower fan whereby the mouth of the pocket is thus defined at the upper side thereof extending transversely of the duct to positively trap grain, the wall portion also shielding the pocket from direct pressure of the conveying current and thus reducing the amount of air which would escape through the clearing slit of the pocket, permitting said slit to be of relatively larger size, facilitating its grain clearance without the loss of an excessive amount of air.

What is claimed is:

1. The combination with a conveying air duct, means for providing a pressure current of air in said duct and means for feeding into said duct material to be conveyed, of a pocket communicating with the duct and adapted to receive material tending to accumulate in the duct under adverse conveying conditions, and a restricted discharge passage leading from the pocket whereby the pressure of conveying current of air clears the pocket of accumulated material through said passage.

2. The combination with a conveying air duct, means for providing a pressure current of air in said duct and means for feeding into said duct material to be conveyed, of a pocket communicating with the duct and adapted to receive surplus material tending to accumulate in the duct under adverse conveying conditions, said pocket being provided with an aperture opening into the atmosphere and normally unobstructed in operation of the apparatus, the cross-sectional area of said aperture being restricted to provide a discharge current sufficient to clear the pocket of accumulated material without permitting the discharge of a material amount of the conveying current of air.

3. The combination with a conveying air duct, means for providing a pressure current of air in said duct and means for feeding into said duct material to be conveyed, of a pocket extending transversely of and communicating with the bottom of the duct to receive surplus material tending to accumulate in the duct under adverse conveying conditions, said pocket being provided with a hopper shaped bottom having a longitudinal slit opening into the atmosphere, said slit being normally unobstructed in operation of the apparatus and being restricted in width to provide a discharge current sufficient to clear the pocket of accumulated material without permitting the discharge of a material amount of the conveying current of air.

In testimony that I claim the foregoing I have hereunto set my hand at Milwaukee, in the county of Milwaukee and State of Wisconsin.

GEORGE BERNERT.